J. W. DRISCOLL.
VEHICLE TIRE.
APPLICATION FILED DEC. 29, 1909.
998,476.
Patented July 18, 1911.
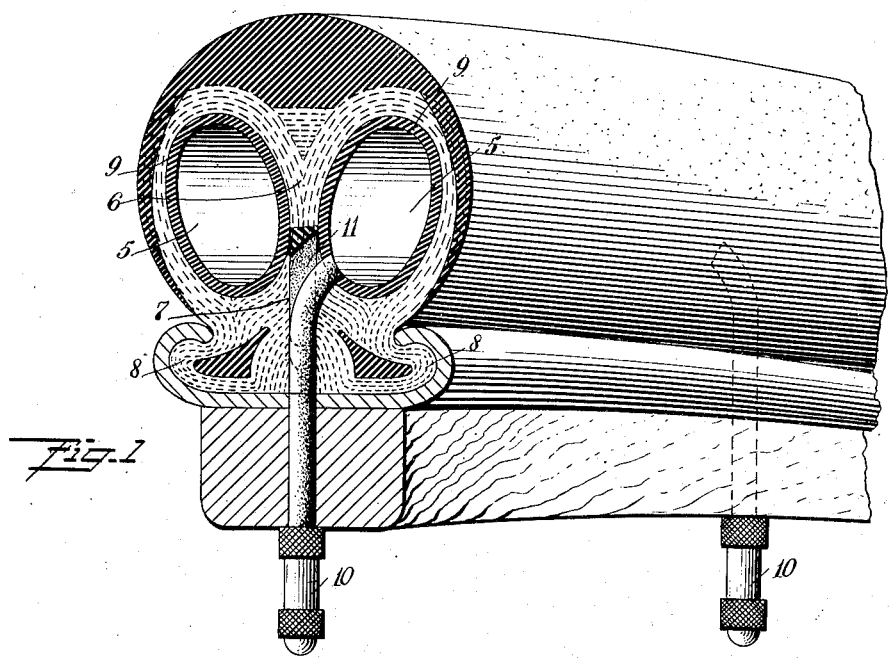
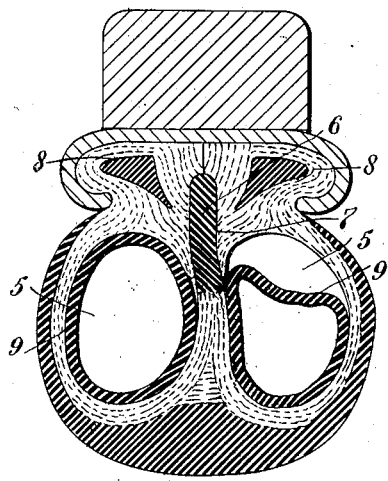
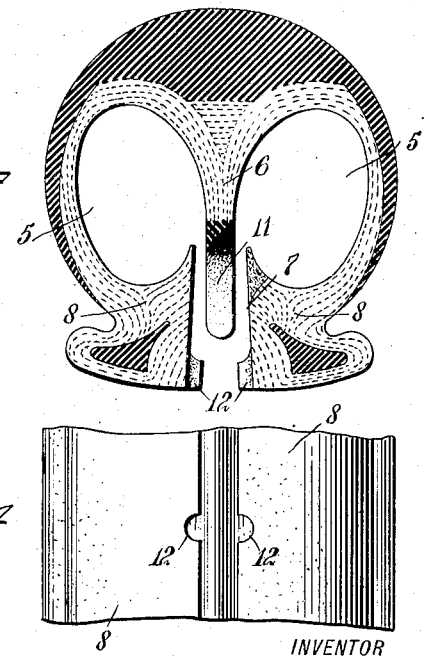
WITNESSES:
E. G. Bromley
INVENTOR
John William Driscoll
BY
Munn & Co.
ATTORNEYS

BEST AVAILABLE COPY

UNITED STATES PATENT OFFICE.

JOHN WILLIAM DRISCOLL, OF CENTRAL CITY, COLORADO.

VEHICLE-TIRE.

998,476.     Specification of Letters Patent.     Patented July 18, 1911.

Application filed December 29, 1909. Serial No. 535,510.

*To all whom it may concern:*

Be it known that I, JOHN WILLIAM DRISCOLL, a citizen of the United States, and a resident of Central City, in the county of Gilpin and State of Colorado, have invented a new and Improved Vehicle-Tire, of which the following is a full, clear, and exact description.

The invention is an improvement in pneumatic tires, and has in view a tire having pneumatic tubes so arranged therein that the chances of puncture are remote, each tube being separate and independent of the other tube, so that the tire is not rendered unfit for use should one tube be deflated, a tongue being provided between the tubes and arranged to serve as a support for the tread under such conditions.

Reference is to be had to the accompanying drawings forming a part of this specification, in which similar characters of reference indicate corresponding parts in all the views.

Figure 1 is a perspective view of a portion of a tire embodying my invention, the same being shown applied to the rim of a wheel and in cross-section; Fig. 2 is a cross-section of the tire working under a load with but one tube inflated; Fig. 3 is a cross-section of the tire separated from the rim and relaxed, with the inner pneumatic tubes removed; and Fig. 4 is an inverted plan of a portion of the tire.

The body of the tire is constructed of the usual materials, such as rubber, canvas, etc., and is shown to have the conventional outer form. At each side of the vertical center the tire is constructed with endless tube passages 5, 5, these passages preferably being of elliptical or oval cross-section, with the major axes diverging outwardly toward the opposite sides of the tire tread, the latter being of substantial thickness, as shown in several of the figures.

A tongue 6 forms a partition between the tube passages 5, and is arranged to assist in supporting the tire tread when the tire is loaded, the point of the tongue of approximately uniform thickness being received within a groove 7 vertically arranged in the inner portion of the tire, the point or inner edge of the tongue normally standing above the bottom of the groove, as shown in Fig. 1, when the tire is not compressed, and resting on the bottom of the groove and supporting the tread when the tire is loaded, as shown in Fig. 2. By reason of the point of the tongue being of uniform thickness the same will fit the groove snugly, both when the tire is loaded and unloaded. The inner portion of the tire is centrally divided into two half portions 8, 8, each portion containing a part of the groove 7, and ordinarily standing away from each other and from the tongue 6, as shown in Fig. 3, when the tire is relaxed. This manner of dividing the tire permits of the insertion and removal into and from the tube passages of the pneumatic tubes 9, each tube, as shown in Fig. 1, being connected with a valve tube 10, through which it is inflated, the tube of the valve, as shown, passing through the rim of the wheel and between the two divided portions of the tire to its respective inner tube, the tongue 6 over each tube 10 being provided with a cut-out portion or slot 11 so that the tube 10 will not interfere with the tongue seating on the bottom of the groove 7. Each portion 8 is also provided with a semi-circular groove 12, which receives the opposite sides of the tube when the said portions of the tire are bound together by the rim.

Having thus described my invention, I claim as new and desire to secure by Letters Patent:

1. A pneumatic tire having tube passages, and a tongue extending from the tread portion of the tire and forming a partition between the passages, the point of the tongue of approximately uniform thickness, and the inner portion of the tire divided into two separable parts, providing access to the passages, and having a groove arranged therebetween receiving the point of the tongue, with the side walls of the groove normally bearing on the opposite sides of the tongue a substantial distance.

2. A pneumatic tire having endless inner tube passages arranged at the opposite sides of the vertical center, with the inner or base portion thereof approximately centrally divided and provided with a groove, and a tongue carried by the outer portion of the tire extending between said passages and received in said groove, the tongue being of a depth to bear on the bottom of the groove and support the tire tread when the tire is substantially loaded, and stand above the bottom of the groove when the load is released, the tongue in both of its positions being engaged at opposite sides by the side walls of the groove.

In testimony whereof I have signed my name to this specification in the presence of two subscribing witnesses.

JOHN WILLIAM DRISCOLL.

Witnesses:
JESSE GRAVES,
CHAS. WITHROW.